Oct. 3, 1967 H. SCHMID 3,345,505

FUNCTION GENERATOR

Filed Oct. 24, 1960 3 Sheets-Sheet 1

HERMANN SCHMID
INVENTOR

BY Richard G. Stephens
ATTORNEY

Oct. 3, 1967 H. SCHMID 3,345,505

FUNCTION GENERATOR

Filed Oct. 24, 1960 3 Sheets-Sheet 2

HERMANN SCHMID
INVENTOR

BY Richard G. Stephens
ATTORNEY

Oct. 3, 1967 H. SCHMID 3,345,505

FUNCTION GENERATOR

Filed Oct. 24, 1960 3 Sheets-Sheet 3

HERMANN SCHMID
INVENTOR

BY Richard G. Stephens
ATTORNEY

United States Patent Office 3,345,505

Patented Oct. 3, 1967

3,345,505

FUNCTION GENERATOR

Hermann Schmid, Binghamton, N.Y., assignor to General Precision Systems Inc., a corporation of Delaware Filed Oct. 24, 1960, Ser. No. 64,428

19 Claims. (Cl. 235—197)

This invention relates to improved electronic function generator circuitry, and more particularly, to a high-speed, high-accuracy function generator of almost universal utility. In the electronic arts generally, and particularly in the computer, automatic control and instrumentation arts, there exists a need for improved devices which will accept signals representing values of real or simulated variables and which will accurately and quickly provide output signals which are arbitrary, sometimes very complicated, functions of the variable. A variety of known electronic function generators have severe limitations. Linear segment diode function generators, probably most widely used at present, are undesirably inaccurate, especially for low values of input signal, and they require tedious and time-consuming adjustment, sometimes re-iteratively, and calibration. Many electronic applications require function generators which may be rapidly and easily programmed, and then later re-programmed, or up-dated. Most arbitrary function generators are extremely difficult to alter so that they will follow new curves. The present invention, on the other hand, is provided with a matrix translator circuit which may be selectively connected, as by means of a punched card reader, for example, so that mere substitution of a different punched card may provide a completely new function. The present invention also is advantageous in that no slowly-acting components need be used, and no moving parts are required. The response speed of the invention is limited only by the response of direct-coupled amplifiers used therewith. Since the operation of the invention is easily understood, the punched cards or other selective connection means used in the invention may be fabricated easily without complex intermediate coding or computation being required, and maintenance is accomplished easily since faulty components may be located readily by straightforward analysis. Thus it is a primary object of the present invention to provide an improved electronic function generator circuit which may be used to provide any arbitrary function and which may be readily re-programmed, if desired, to provide new functions. Attending objects of the invention are to provide a function generator of the type described which is accurate, fast, easily programmed and maintained, and which is simple and economical.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 3:
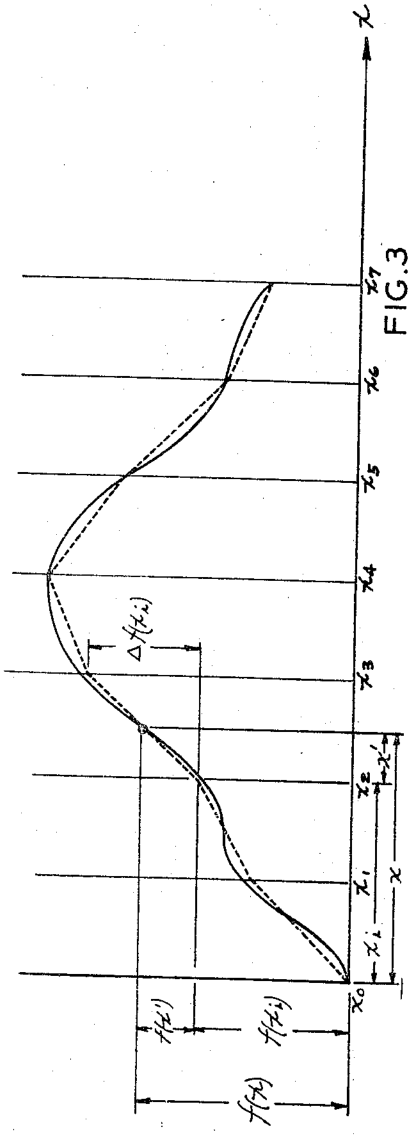
FIG. 3 is a plot of an arbitrary desired function $f(X)$ with respect to variable X, useful in understanding several concepts underlying the instant invention.

An arbitrary function $f(X)$ to be generated is shown in FIG. 3 plotted against variable X, and a linear approximation of the function is shown in dashed lines. The abscissa is shown divided into eight sections lying between eight discrete, evenly-spaced "breakpoint" values of X, labelled $X_0$ through $X_7$. Any value of independent input variable X may be seen to be definable in terms of the value $X_i$ to its adjacent lower "breakpoint" value, plus an amount X′ equalling the difference between X and the selected $X_i$ or "breakpoint" value. Thus $X=X_i+X'$. In the specific example shown in FIG. 3, the value of $X_i$ is shown as equalling $X_2$.

The value of the desired function $f(X)$ similarly may be specified in terms of the value of the function at the selected adjacent "breakpoint" plus an amount depending upon the slope of the function between the two adjacent "breakpoint" values, or, more precisely:

$$f(X)=(X-X_i)\frac{\Delta f(X)}{X}+f(X_i)$$

Figure 1:
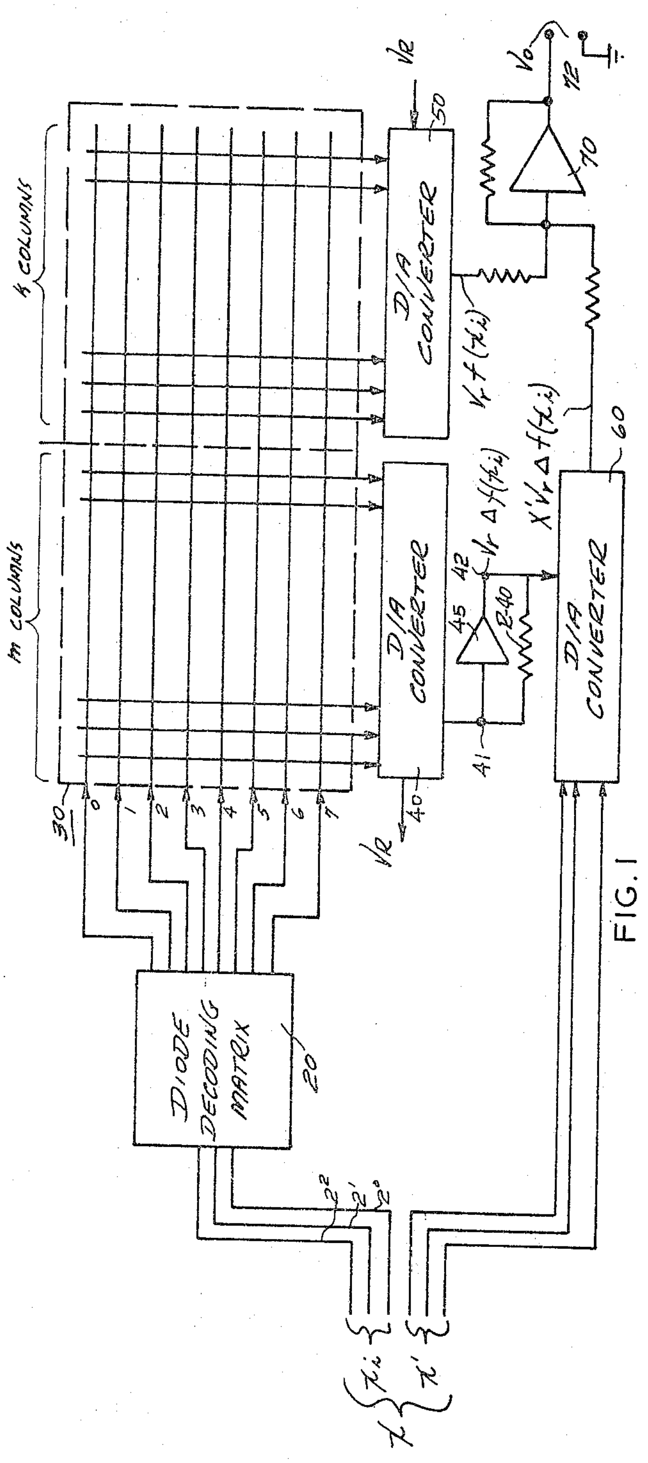
FIG. 1 is an electrical schematic diagram of an embodiment of my invention which is adapted to receive a binary coded digital input signal representing the instantaneous value of a variable, and which will provide an analog output voltage having a magnitude and sign commensurate with a desired arbitrary function of the variable.

In FIG. 1 a plurality of input lines are connected to provide an input voltage to the system commensurate with a digital representation of the input independent variable X. The three most-significant digit input lines are assigned to provide the $X_i$ term of the equation and the least significant digits determine the X′ term. The three lines $2^0$, $2^1$, and $2^2$ are capable of providing eight different binary numbers, each one of which pertains to one of the abscissa breakpoint values of FIG. 3. The three-digit input signal specifying the value of $X_i$ is received by decoding matrix 20, which energizes a particular one of its output lines (0 through 7) depending upon the input number fed to matrix 20. For example, if lines $2^0$ and $2^2$ were energized and line $2^1$ not energized, which would indicate the number "five" in binary code, output line 5 of decoding matrix 20 would be energized and lines 0 through 4, 6 and 7 would be de-energized. Only one of the decoder 20 output lines is energized at any one time. Such decoding matrices are well-known in the art and need not be described further.

Each of the output lines from decoding matrix 20 comprises a horizontal or row control input line for a diode translation circuit 30, and each line will carry only binary, i.e. "on-off," information. Thus it will be seen that decoder 20 receives a digital input signal commensurate (except for the X′ remainder) with the instantaneous value of the input variable X, and operates to energize one of the translator 30 input lines, which one depending upon the instantaneous value of the variable. The columns, or vertical lines of translation matrix 30 comprises bus wires, to which the signals on the row control input lines (0 through 7) are selectively connected in accordance with the function being generated. In cases of devices where known functions are required absolutely permanently, soldered or other permanent connections may be made from each row input line through diodes (not shown) to particular vertical lines. Where the function to be generated is rather likely to require alteration, the diode connections of rows to columns in translation matrix 30 may be made by means of a patchboard. Where the function is required to be changed regularly, the diode connections should be made between rows and columns by means of selective connection means, such as a standard punched card reader, for example. The matter of which and how many vertical lines are connected to be energized by a given row will depend strictly upon the values of the function desired. Only one horizontal control row will be energized at any one time, but depending upon the number and position of the diode connections made for that row, appropriate column wires will be energized, so that the column wires provide a digital signal specifying the value of the desired function at the selected or instantaneous value of independent input variable. The use of diodes to prevent "sneak" circuits in switching matrices is well known, so the diodes, for convenience, are not shown in the drawing.

The translation matrix 30 of FIG. 1 may be seen to include two sections. The right-hand section includes a plurality of $k$ column wires for producing a $k$-digit binary number representing $f(X_i)$, the value of the desired function at the adjacent lower "breakpoint" value of input variable. The left-hand section comprises a plurality of $m$ column wires for producing an $m$-digit binary number representing $\Delta f(X_i)$, the slope of the desired function between the two "breakpoints" adjacent the instantaneous input variable value. When actually constructing a translation matrix it is in no way essential that it be divided physically into two sections of the type described, and, if desired, "$k$" digits may be intermixed with "$m$" digits, but provision of separate sections facilitates analysis and trouble-shooting.

Each of the binary numbers is next converted by means of a separate digital-to-analog converter to an analog voltage. The analog voltage proportional to $\Delta f(X_i)$, the slope of the function over the appropriate interval, is multiplied by the digital X′ input signal by identical circuitry to provide an interpolated increment $X'\Delta f(X_i)$, which is added to the $f(X_i)$ voltage to provide the desired function output voltage $V_o$ at terminal 72.

Figures 2, 4:
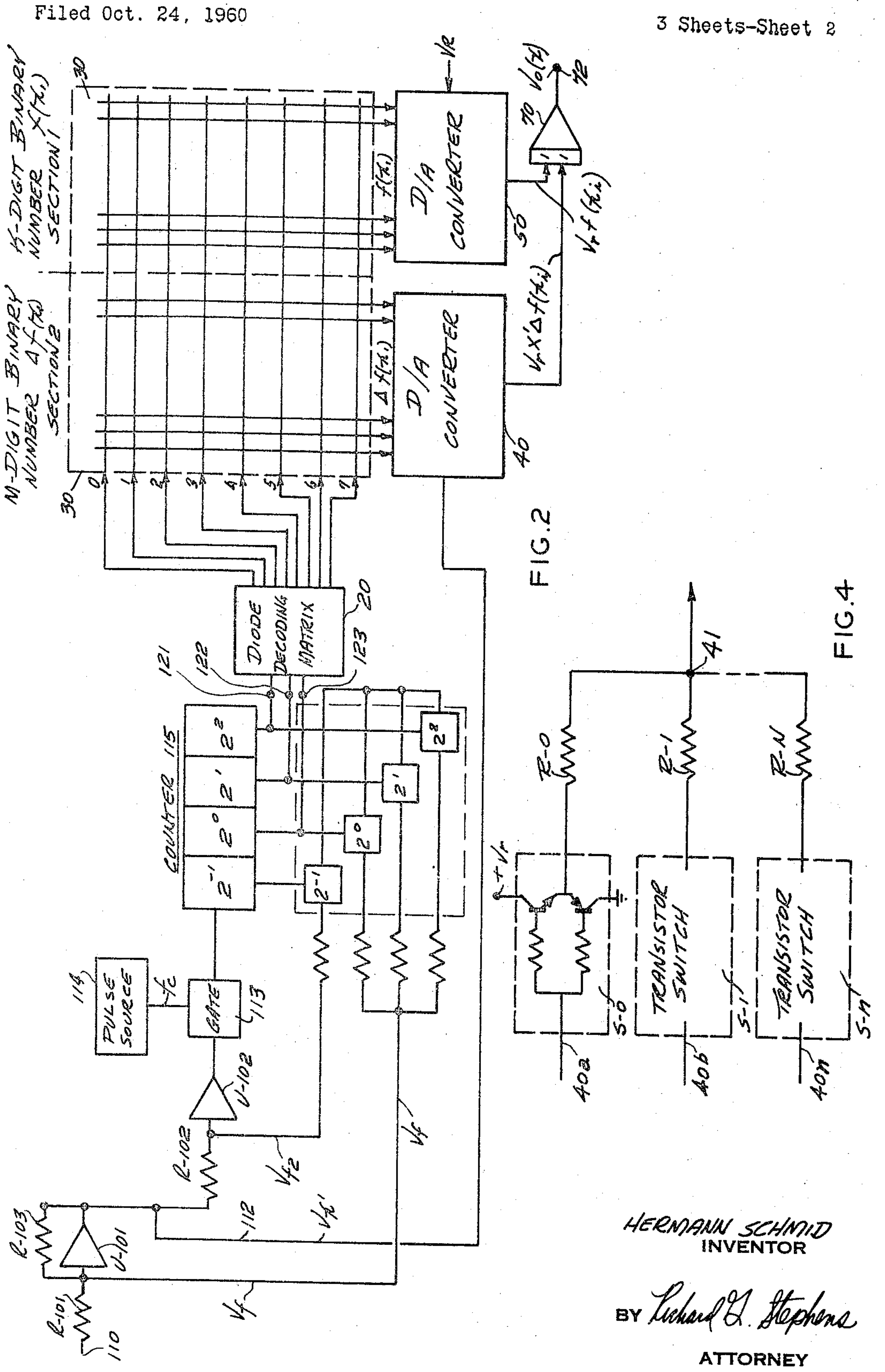
FIG. 2 is an electrical schematic diagram of a further embodiment of my invention which is adapted to receive analog input voltages and provide an analog output voltage.
FIG. 4 is an electrical schematic diagram of a special digital-to-analog converter used in the invention.

The details of an exemplary digital-to-analog converter 40 which may be used in my invention are shown in FIG. 4, wherein converter 40 will be seen to comprise a plurality of complementary transistor switches S–0, S–1, . . . S–$n$ connected through precision binary-scaled resistances R–0, R–1 . . . R–$n$ in parallel-adding circuit relationship to a summing junction terminal 41. Each transistor switch is connected to a stabilized precision reference voltage source indicated by the terminal $V_r$. In the absence of any input voltage on the base input lines 40$a$, 40$b$ etc. to a given switch, the emitter terminals of the switches remain at ground potential, applying no input currents through the scaling resistors. Energization of any base input line, however, causes its associated transistor to become saturated, and the value of the reference voltage $V_r$, less a very small voltage drop of about one millivolt, appears at the switch common emitter terminal, and a binary-scaled input voltage is applied to the summing junction 41.

The fact that the collector-to-emitter voltage drop across the saturated transistor is so small contributes very importantly to the accuracy of the overall apparatus. Terminal 41, the output terminal of converter 40, comprises the summing junction terminal of direct-coupled feedback amplifier 45, which is provided with feedback resistance R–40. The scaling resistors of converter 40 are scaled in binary fashion, with the least resistance contained in the switching circuit associated with the most significant digit, and it will be seen that an accurate analog voltage proportional to $V_r$ and to $\Delta f(X_i)$ will appear at the output terminal 42 of summing amplifier 45. This voltage is applied to converter circuit 60 which may be identical to converter circuit 40, but which utilizes the converter 40 output as its reference voltage in performing a digital-to-analog conversion of the X′ digital independent variable input signal, thereby performing a multiplication of $V_r\Delta f(X_i)$ by $X'$ as well as a conversion of $V_rX'\Delta f(X_i)$ to analog form. The $f(X_i)$ digital signal from translation matrix 30 is converted to analog form by converter 50, which may be identical to converter 40, providing an analog voltage commensurate with $V_rf(X_i)$, which may be applied to a utilization circuit including direct-coupled summing amplifier 70. In many applications of the invention the device connected to utilize the generated function voltage already will be provided with an input circuit suitable for summing the wo input signals shown being applied to amplifier 70, so that no extra amplifier need be provided. The output voltage $V_o$ at terminal 72 equals the desired sum of $X'V_r\Delta f(X_i)$ and $f(X_i)$ hence it provides the desired function.

It will be recognized that the function generator of FIG. 1 is capable of generating any desired function (of a single variable) with a very high accuracy limited only by the accuracy of the scaling resistors in the digital-to-analog converters and the precision of the amplifiers used. It will be noted that no timing circuitry is utilized, so that the circuit speed of response is extremely high, being limited only by the direct-coupled amplifiers. In a typical embodiment of the invention, the independent variable X might be represented by perhaps 14 digits, eleven being used to generate X′ and three being used to generate $X_i$, while the output desired function might be specified by 25 digits, $f(X_i)$ using 14 and $\Delta f(X_i)$ using eleven. Such a circuit would require 124 diodes, 72 transistors, 76 resistors and two DC amplifiers. In the cases of generating more complicated functions with more inflection points, it usually is desirable to provide more breakpoints, which means using more of the input lines to specify $X_i$.

The invention may be combined with a known type of "partial analog to digital converter" or "partial digitizer," so that the combination will accept analog input signals and produce analog output signals, in a manner shown in detail in FIG. 2. An improved form of partial digitizer is shown in my copending application Ser. No. 62,663 filed on Oct. 14, 1960, now Patent No. 3,132,338. The analog-to-digital converter illustrated is designated as a "partial" converter because it converts only part of the input analog signal to digital form and leaves an analog "remainder" or increment. Like very many known analog-to-digital converters, the partial converter of FIG. 2 uses a digital-to-analog converter in the feedback path of a feedback amplifier circuit. In FIG. 2 assume that the input analog signal applied at terminal 110 through resistor R–101 increases, so as to be larger than the feedback voltage $V_f$ applied to amplifier U–101. The difference between the input and feedback voltages applied to amplifier U–101 constitutes the analog "remainder" after the analog input signal has been partially converted. Feedback resistor R–103 makes amplifier U–101 operate linearly, so that the analog "remainder" is accurately provided at terminal 112, for use as later described. Any output from amplifier U–101 also is applied via scaling resistor R–102 as the input voltage to direct-coupled feedback amplifier U–102, which is provided with a feedback potential $V_{f2}$.

If, from a steady-state condition, the input voltage applied via R–102 increases, the amplified error signal thereby caused from amplifier U-102 serves to open coincidence gate 113, allowing clock frequency pulses from pulse source 114 to pass to a conventional binary counter 115, which begins to count upwardly. The state of each stage of binary counter 115 is used to control a respective transistor switch, which in turn gates a precision reference voltage through a precision scaling resistor to provide a component of the $V_f$ feedback voltage. As counter 115 counts upwardly, an increasingly degenerative feedback voltage is generated and applied to amplifier U–101. The states of the stages of counter 115 constitute a binary indication of the magnitude of the input voltage, with the analog "remainder" mentioned above present at terminal 112.

The most significant part or digital output from the partial converter of FIG. 2 is applied via terminals 121, 122 and 123 to the diode decoding matrix of the invention, and in lieu of providing the least significant digits of the input signal in digital form as in FIG. 1, the analog remainder voltage from the partial converter is applied, via terminal 112 to digital-to-analog converter 40, as the reference voltage of converter 40. The $\Delta f(X_1)$ digital slope signal on the $m$ column wires thus is multiplied by the analog "remainder" as well as being converted to an analog signal, so that the output signal from converter 40, without further processing, may be combined with the $f(X_1)$ analog voltage from converter 50, as by means shown as comprising summing amplifier 70; thereby to provide the desired arbitrary function.

In FIG. 1 slopes of the desired function are stored in translation matrix 30 and such slopes are multiplied by X', the distance from the adjacent lower breakpoint in order to compute the incremental value to be added to the adjacent breakpoint value of the function. It is quite within the scope of my invention, however, to store different slope values on the $m$-column section of storage means 30, and to subtract from adjacent upper breakpoint values. Reversing the reference voltage polarity fed to converter 40 or that fed to converter 50 (but not both) would effect subtraction. Those skilled in the art will recognize that both of the two methods of computation actually are methods of interpolating between the two breakpoints which bound the instantaneous value of the input variable. It is quite within the scope of my invention to interpolate by methods other than those which require the storing of slopes and the multiplication of slopes by X' intervals. One very simple alternative interpolation scheme is illustrated in block diagram form in FIG. 5, wherein parts similar to parts of FIG. 1 are given corresponding numbers.

Figure 5:
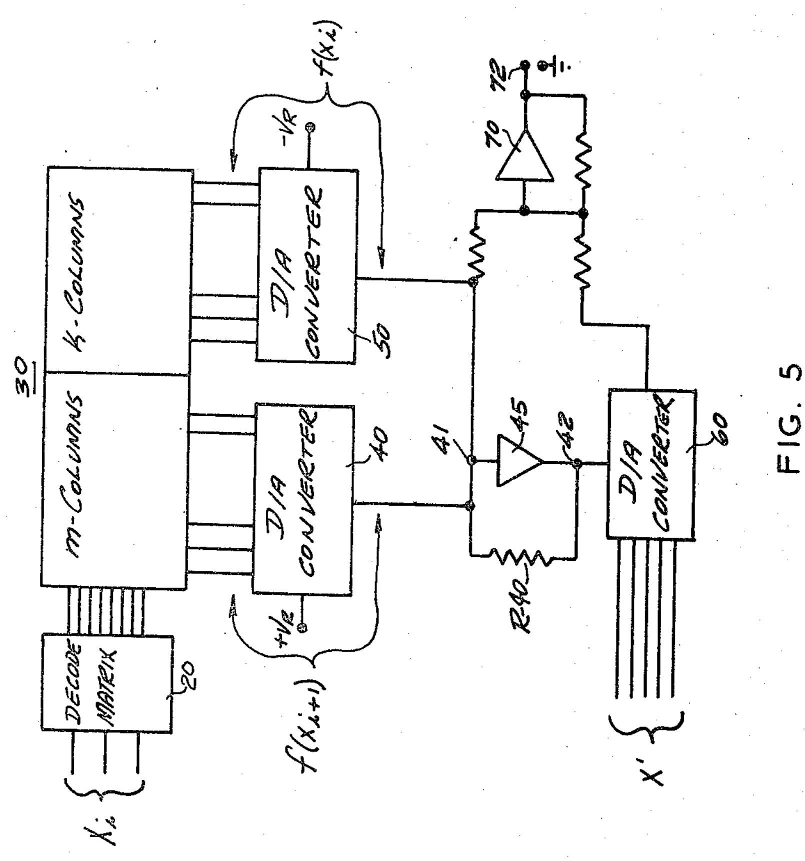
FIG. 5 is a block diagram of a modified form of the device of FIG. 1 in which an alternative interpolation technique is utilized.

Decoding matrix 20 in FIG. 5 operates exactly as its counterpart in FIG. 1, energizing one of the row input conductors of translation matrix digital storage means 30. The $m$ column section of storage 30, however, is connected to store different numbers representing not slopes of the desired function as in FIG. 1, but rather ordinates or specific values of the desired function. For example, values of the desired function at some arbitrary fixed value or distance from each $X_1$ breakpoint may be stored, or $f(X_{1+1})$, for example. When input line 3 of translation matrix 30 is energized, one section of translator 30 provides a digital signal commensurate with the value of the desired function at $X=3$ and the other section provides a further digital signal commensurate with the value of the desired function at $X=4$. An analog voltage proportional to the digital value on the $m$ column conductors is provided by digital-to-analog converter 40, and an analog voltage proportional to $V_r f(X_1)$ is provided by converter 50 in the same manner as shown in FIG. 1. By providing opposite polarity reference voltages at converters 40 and 50, the two analog voltages are caused to subtract, providing an output voltage from amplifier 45 at terminal 42 which is equivalent to the slope voltage produced in FIG. 1. This voltage is multiplied or proportioned by D/A converter 60, which receives the X' remainder input in parallel digital form, to provide an incremental voltage for addition to the $V_r f(X_1)$ analog voltage, in the same manner as in FIG. 1.

While the system shown herein each are capable of generating functions of a single independent variable, the principles taught herein may be utilized in the construction of apparatus for generating an output which varies in accordance with two arbitrary, completely independent, input variables. A function of one variable may be represented by a curve, while a function of two variable may be represented by a family of curves. A single variable function generator is required for each curve, and the second variable is made to select two curves and interpolate between them. By straightforward use of the techniques shown herein and known extensions of the circuitry shown herein, a function generator for any number of arbitrary independent variables may be constructed.

Figure 6:
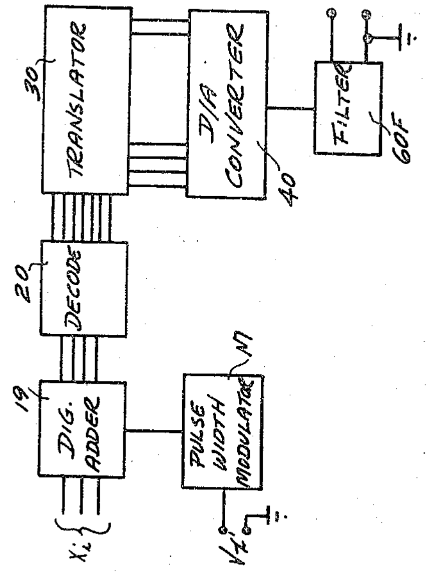
FIG. 6 is a block diagram of a further form of the invention in which interpolation is accomplished by time-modulation.

In a modified form of the invention illustrated in FIG. 6, interpolation between adjacent breakpoints is effected by time modulation operation of the system. Assuming that the function of FIG. 3 is being generated and intitially that $x$ lies at $X_2$, the $X_i$ digital input to conventional digital adder 19 will be 010 (two), and the analog input voltage $V_x'$ (proportional to the remainder X') will be zero. The digital number 010 then will be applied from parallel digital adder 19 to decoder circuit 20, thereby energizing output line No. 2 of the decoder output lines and No. 2 horizontal row input line of translator 30. Connections are made selectively in translator 30 so as to provide a digital output signal from translator 30 commensurate with the value of the desired function at $X_2$. All column wires of translator 30 are digits of such an output signal, and hence translator 30 connections all pertain to function values rather than some pertaining to function slopes. The digital output signal from translator 30 is converted by means of a conventional D/A converter 40 into an analog output signal, which is applied through filter 60F for a purpose to be described below. Parallel binary adder 19 may comprise any one of a number of well-known circuits.

Assuming now the presence of an analog remainder input voltage $V_x'$ proportional to X', output pulses produced from pulse width modulator M will be applied to digital adder 19, thereby adding "one" to the $X_i$ digital input value for time periods proportional to X' remainder value. Pulse width modulator M may take the form shown in my prior Patent No. 2,951,212 issued on August 30, 1960, for example. The $V_x'$ input signal to modulator M is scaled so that an input voltage $V_x'$ equal to the distance between X breakpoints is sufficient to keep the modulator output always "on" or "high". If the value of X were to lie exactly midway between $X_2$ and $X_3$, the $V_x'$ value of 0.5 would cause modulator M to be high for exactly one half of its cycle and low exactly one half of its cycle, thereby adding "1" to the $X_1$ digital input for one half of each cycle of the modulating frequency of pulse width modulator M. During half of a cycle decoder 20 would be energizing row input line No. 2 of translator 30, and energizing line No. 3 during the other half cycle, resulting in digital outputs from translator 30 that varied for equal periods of time between the values of the desired function at $X=2$ and $X=3$. Converter 40 would provide an analogously varying analog voltage, which upon filtering or integrating by low pass filter 60F, represents the desired function. It will be seen that as the X' value varies, the relative times that modulator output adds "1" varies proportionally, thereby effecting an interpolation between values of the function at two adjacent breakpoints. In many applications of the invention the inertia or smoothing characteristics of the utilization device connected to use the generated function will make provision of filter 60F unnecessary.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Electronic function generating apparatus for generating an output voltage which varies as a desired function of an input variable, comprising in combination: a plurality of $p+n$ input lines for receiving a first parallel digital input signal of $p+n$ digits commensurate with said input variable; a decoding switching circuit connected to a plurality $p$ of said $p+n$ input lines of said first input signal and operative to select and energize different ones of a second plurality of $2^p$ conductors, depending upon the value of said $p$ digits of said first parallel digital input signal; a matrix switching circuit having a plurality of row input conductors and first and second groups of column output conductors, said input conductors being selectively connected to various of said output conductors in accordance with said desired function of said variable to provide third and fourth parallel digital signals on said column output conductors, a first digital-to-analog converter responsive to the digital signal on said first group of column output conductors and to a reference voltage for providing a first analog voltage signal proportional to both the value of said third digital signal and to said reference voltage; a second digital-to-analog converter responsive to the digital signal on said second group of column output conductors and to a reference voltage for providing a second analog voltage signal proportional to both the value of said fourth digital signal and to said reference voltage; a third digital-to-analog converter connected to $n$ of said $p+n$ input lines to receive $n$ digits of said input signal and connected to said second analog voltage signal for providing a third analog voltage signal proportional to both the value of said $n$ digits of said input signal and to said second analog voltage signal; and utilization means including summing means connected to said first and third analog voltage signals.

2. Electronic function generating apparatus for generating an output voltage which varies as a desired function of an input variable comprising in combination: a matrix circuit digital number storage means having a plurality of row input conductors, first and second groups of column output conductors, and selective connection means for making connections selectively between said row conductors and various of said column conductors, each of said row input conductors being associated with a respective discrete value of said input variable; means responsive to an input signal for selectively energizing said row input conductors so as to energize the conductor associated with a discrete value of said input variable adjacent the instantaneous value of said input variable; said selective connections being made between said row input conductors and said first group of column output conductors in accordance with the values of said desired function at said discrete values of said input variable and said selective connections being made between said row input conductors and said second group of column output conductors in accordance with the slopes of said desired function between said discrete values of said input variable; means connected to said first group of column output conductors to provide a first analog voltage commensurate with the value of said desired function at a discrete value of said input variable adjacent the instantaneous value of said input variable; means connected to said second group of column output conductors to provide a second analog voltage commensurate with the slope of said desired function between the pair of discrete values adjacent the instantaneous value of said input variable means responsive to said input signal for modifying said second analog voltage to provide an incremental voltage; and means for combining said first analog voltage and said incremental voltage to provide said output voltage.

3. Electronic function generating apparatus for generating output voltages in accordance with a desired function of an input variable, comprising in combination; a matrix switching circuit means having a plurality of row input conductors and a plurality of column output conductors, and selective connection means for making connections selectively between said row conductors and various of said column conductors, each of said row input conductors being associated with a respective discrete value of said input variable; means responsive to an input signal commensurate with the instantaneous value of said variable for selectively energizing one of said row input conductors; said selective connections including connections made between said row input conductors and various of said column output conductors in accordance with the values of said desired function at said discrete values of said input variable; means connected to said column output conductors for providing first analog voltages commensurate with the values of said desired function at said discrete values of said input variable; means responsive to said input signal for providing incremental analog voltages commensurate with the differences between the value of the desired function at said discrete values and the value of said desired function at the instantaneous value of said input variable; and means for combining said first analog voltages and said incremental analog voltages to provide said output voltages.

4. Electronic function generating apparatus for generating output voltages in accordance with a desired function of an input variable, comprising in combination; a matrix switching circuit means having a plurality of row input conductors and a plurality of column output conductors, and selective connection means for making connections selectively between said row conductors and various of said column conductors, each of said row input conductors being associated with a respective discrete value of said input variable; means responsive to an input signal commensurate with the instantaneous value of said variable for selectively energizing one of said row input conductors; said selective connections including connections made between said row input conductors and various of said column output conductors in accordance with the slopes of said desired function between pairs of said discrete values of said input variable; means connected to said column output conductors for providing first analog voltages commensurate with the differences between the values of said desired function at instantaneous values of said variable and values of said desired function at said discrete values of said input variable; means responsive to said input signal for providing further analog voltages commensurate with values of said desired function at said discrete values of said input variable; and means for combining said first analog voltages and said further analog voltages to provide said output voltages.

5. Electronic function generating apparatus for generating an output voltage which varies as a desired function of an input variable, comprising in combination: a plurality of $p+n$ input lines for receiving a first parallel digital signal of $p+n$ digits commensurate with the instaneous value of said input variable; a decoding circuit connected to $p$ of said input lines to energize a selected one of a second plurality of $2p$ conductors; a digital number storage means connected to said second plurality of conductors to be addressed by said decoding circuit to provide third and fourth parallel digital signals, said third parallel digital signal representing the value of said desired function at a selected discrete value of said input variable; means responsive to said fourth parallel digital signal and said $n$ input lines for providing a first analog signal commensurate with the difference between said value of said desired function at said selected discrete value of said input variable and the value of said desired function at the instantaneous value of said input variable; means for converting said third parallel digital signal to a second analog signal; and means for combining said first and second analog signals to provide said output voltage.

6. Electronic function generating apparatus for generating output voltages which vary in accordance with a desired function of an input variable; comprising in combination: a matrix connection circuit means having a plurality of row input conductors and first and second groups of column output conductors; and selective connection means connecting said row conductors selectively to various of said column output conductors, each of said row input conductors being associated with a respective discrete value of said input variable, said selective connections being made in accordance with the values of said desired function; means for selectively energizing said row input conductors in accordance with the instantaneous variable of said input variable; and means connected to said column output conductors for providing said output voltages.

7. Apparatus according to claim 6 in which said means for selectively energizing said row input conductors comprises means for providing a parallel digital signal which varies cyclically between two values bounding the instaneous value of said variable and which remains at said two values for time periods inversely proportional to the differences of said two values from the instantaneous value of said variable, thereby providing cyclically varying signals from said matrix connection circuit means.

8. Apparatus according to claim 6 in which said means for selectively energizing said row input conductors comprises decoder means for selectively energizing said row input conductors in accordance with the value of a digital sum signal; a digital adder circuit operative to receive a digital input signal commensurate except for a remainder with the instantaneous value of said variable and to receive a time-modulated binary signal commensurate with the value of said remainder, said adder circuit being operative to provide said digital sum signal, which varies in time between two digital numbers in accordance with said time-modulation; and pulse width modulator means responsive to an input voltage commensurate with the instantaneous value of said remainder for providing said time-modulated binary signal.

9. Apparatus for receiving an analog voltage input signal commensurate with the instantaneous value of a variable and for providing an analog output voltage commensurate with a desired function of said variable; comprising in combination: a partial digitizer circuit connected to receive said analog voltage input signal and operative to provide a partially digitized signal including a parallel digital signal and a second analog voltage signal together commensurate with said instantaneous value of said variable; a matrix connection circuit means having a plurality of row input conductors and a plurality of column output conductors with connections made selectively between said row conductors and said column conductors in accordance with the values of said desired function; decoding means responsive to said parallel digital signal for selectively energizing said row input conductors; first digital-to-analog converter means connected to a first group of said column conductors to provide a third analog voltage; second digital-to-analog converter means connected to said second analog voltage and to a second group of said column conductors to provide a fourth analog voltage; and utilization means including summing means connected to sum said third and fourth analog voltages to provide said analog output voltage.

10. An apparatus accordance to claim 6 wherein said means connected to said column output conductors comprises digital-to-analog converter means.

11. An apparatus accordance to claim 6 wherein said selective connection means is operative to connect said row conductors to said first group of said column output conductors in accordance with discrete values of said function at predetermined values of said input variable, and further operable to connect said row conductors to said second group of column output conductors in accordance with the slopes of said desired function between pairs of predetermined values of said input variable.

12. An apparatus accordance to claim 6 wherein said selective connection means includes a plurality of diode elements, and means for connecting said input conductors to said output conductors through said diode elements.

13. An apparatus according to claim 6 wherein said selective connection means includes a punched card reader.

14. A function generator comprising, a plurality of input terminals for parallelly accepting signals commensurate with an input variable; a diode decoding matrix coupled to said plurality of input terminals and having a plurality of output lines connected thereto, one and only one of said plurality of output lines being energized in response to said input variable; a diode translation circuit including a further plurality of conductors; selective connection means connecting certain ones of said further plurality of conductors to ones of said plurality of output lines, said certain ones of said plurality of said further plurality of conductors providing a digital encoded signal specifying the value of the desired function of said input variable.

15. The generator of claim 14 wherein said selective connection means provides a digital signal accordance with the value of said desired function at discrete break point along a first group of said plurality of further conductors and provides another digital signal in accordance with the slope of said desired function at said discrete break points along a second group of said plurality of further ocnductors.

16. The generator of claim 15 wherein said discrete breakpoints are spaced apart in equal increments.

17. The generator of claim 15 wherein said discrete breakpoints are spaced apart by unequal increments.

18. The generator of claim 14 wherein said selective connection means includes a programmable patch board.

19. The generator of claim 14 wherein said selective connection means includes a standard punch card reader.

References Cited

UNITED STATES PATENTS

| | | | |
|---|---|---|---|
| 2,925,220 | 2/1960 | Serrell | 235—197 |
| 2,933,254 | 4/1960 | Goldberg et al. | 235—197 |
| 2,944,737 | 7/1960 | Cail et al. | 235—197 |
| 3,003,143 | 9/1961 | Beurrier | 340—347 |

OTHER REFERENCES

Dec. 1–3, 1959, "A Combined Analog-Digital Differential Analyzer," by Skramstad, Eastern Joint Computer Conference, pp. 94–100.

MALCOLM A. MORRISON, *Primary Examiner.*

WALTER W. BURNS, Jr., DARYL W. COOK, *Examiners.*